United States Patent
Tatsumi

(10) Patent No.: US 7,224,360 B2
(45) Date of Patent: May 29, 2007

(54) IMAGE DISPLAY METHOD, IMAGE PROCESSING METHOD, IMAGE PROCESSING APPARATUS, SCAN CAPTURING APPARATUS AND IMAGE SIGNAL GENERATION METHOD

(75) Inventor: Setsuji Tatsumi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 301 days.

(21) Appl. No.: 10/280,070

(22) Filed: Oct. 25, 2002

(65) Prior Publication Data
US 2003/0085894 A1 May 8, 2003

(30) Foreign Application Priority Data
Oct. 25, 2001 (JP) .............................. 2001-327982

(51) Int. Cl.
*G06T 15/50* (2006.01)

(52) U.S. Cl. .................. 345/426; 345/420; 345/581; 345/672; 348/142; 348/143; 356/369; 382/141

(58) Field of Classification Search ................ 345/426, 345/672, 425; 358/1.16, 1.1, 1.13; 382/194; 356/369
See application file for complete search history.

(56) References Cited

U.S. PATENT DOCUMENTS

| | | | |
|---|---|---|---|
| 4,928,250 A * | 5/1990 | Greenberg et al. | 345/426 |
| 5,552,890 A * | 9/1996 | Nanna et al. | 356/369 |
| 5,717,848 A * | 2/1998 | Watanabe et al. | 345/474 |
| 6,317,126 B1 * | 11/2001 | Tannenbaum | 345/426 |
| 6,639,594 B2 * | 10/2003 | Zhang et al. | 345/426 |
| 6,771,385 B1 * | 8/2004 | Iizuka et al. | 358/1.15 |
| 6,806,974 B1 * | 10/2004 | Ueda et al. | 358/1.13 |
| 2002/0076106 A1 * | 6/2002 | Kondo et al. | 382/194 |
| 2004/0105125 A1 * | 6/2004 | Ezawa | 358/1.16 |

FOREIGN PATENT DOCUMENTS

| | | |
|---|---|---|
| JP | 5-135155 | 6/1993 |
| JP | 7-66436 | 7/1995 |
| JP | 8-39841 | 2/1996 |
| JP | 2001-108421 | 4/2001 |

OTHER PUBLICATIONS

Masaki Otsuki, et al.; "Extraction of Specular Reflection Using Multiple Color and Range Images"; Department of Electrical and Computer Engineering, Nagoya Institute of Technology, Nagoyashi, 466 Japan; The Institute of Electronics, Information and Communication Engineers Transaction, D-11 vol. J-80-D-11,1; No. 6, pp. 1352-1359; Jun. 1997.

* cited by examiner

*Primary Examiner*—Kee M. Tung
*Assistant Examiner*—Antonio Caschera
(74) *Attorney, Agent, or Firm*—Sughrue Mion, PLLC

(57) ABSTRACT

A plurality of captured images of a still subject are obtained by changing at least one of a position and a direction of illumination of a light source to illuminate the still subject. Sequenced frame images are formed based on the captured images. The sequenced frame images are sequentially switched so that the selected ones can be displayed.

7 Claims, 10 Drawing Sheets

FIG. 14

IMAGE SIGNAL (32 BIT SIGNAL)

HEADER INFORMATION
 ATTRIBUTES OF FIRST TO FOURTH REFLECTION SIGNALS
 · SPECULAR REFLECTION MOVING DIRECTION (x DIRECTION, y DIRECTION, ANGLE $\theta$)
 · SPECULAR REFLECTION INTENSITY (h)
 · SPECULAR REFLECTION SIZE (w)
 · SPECULAR REFLECTION MOVING PERIOD (N)
 · SPECULAR REFLECTION MOVING PHASE ($\delta$)
 · SPECULAR REFLECTION MOVING DISTANCE ($X_0$, $Y_0$, $L_0$)

+

SIGNAL INFORMATION
 · DIFFUSE REFLECTION IMAGE SIGNAL (R,G,B SIGNAL) (3 × 8 BIT SIGNAL)
 · REFLECTION SIGNAL
  FIRST REFLECTION SIGNAL = FIRST GLOSSINESS SIGNAL $R_1$ (2 BIT SIGNAL)
  SECOND REFLECTION SIGNAL = SECOND GLOSSINESS SIGNAL $R_2$ (2 BIT SIGNAL)
  THIRD REFLECTION SIGNAL = THIRD GLOSSINESS SIGNAL $R_3$ (2 BIT SIGNAL)
  FOURTH REFLECTION SIGNAL = FOURTH GLOSSINESS SIGNAL $R_4$ (2 BIT SIGNAL)

IMAGE DISPLAY METHOD, IMAGE PROCESSING METHOD, IMAGE PROCESSING APPARATUS, SCAN CAPTURING APPARATUS AND IMAGE SIGNAL GENERATION METHOD

BACKGROUND OF THE INVENTION

1. Field of the Invention

The present invention relates to an image display method for representing texture of a subject such as glossiness of a surface of a still subject or finely woven texture, an image processing method for this image display, an image processing apparatus for implementing this image processing method, a scan capturing apparatus for obtaining a captured image for performing the image display, and an image signal generation method for representing the texture of the subject.

2. Description of the Related Art

In these days, although it is possible to capture an image of a subject with a scanner or a camera to obtain a high quality image, it is difficult to reproduce texture such as glossiness of a substantially planar subject or fine unevenness on the surface of the subject by a raptured image obtained by photographing the subject. A method of representing texture of a subject includes processing by computer graphics (CG). For example, in three-dimensional data on a computer representing a subject, a specular reflection ratio, a diffuse reflection ratio, and the like are defined as information representing the texture, the three-dimensional data is subjected to rendering processing to calculate two-dimensional data and display the two-dimensional data as a two-dimensional image.

In general, the texture that a person feels, such as glossiness of a subject is obtained through a change in a state of specular reflection of the subject due to a change in a viewpoint of a viewer as in the case in which, when a person evaluates an object, he/she evaluates it while holding and shaking it by hands.

Therefore, in the above-mentioned CG, it is also necessary to subtly change a direction for illuminating a subject and perform rendering processing repeatedly such that specular reflection light changes dynamically. Since an amount of this rendering processing is large, time required for the rendering processing becomes extremely long.

Even if a processing speed of a computer further increases in future, it is still difficult to promptly generate realistic shape data and information on the texture of a subject using the method of the above-mentioned CG.

On the other hand, it has been proposed to perform modeling of three-dimensional data including information on the texture of a subject with a computer using a photographed image of the subject.

In JP 07-066436 B and JP 2001-108421 A, a method of photographing a plurality of images from different viewpoints to obtain three-dimensional data is proposed. However, since this method does not separate specular reflection light and diffuse reflection light, sufficient information on the texture of a subject cannot be obtained.

On the other hand, as a method of separating specular reflection light and diffuse reflection light in order to perform three-dimensional modeling of a subject, a method based on a dichroism reflection model is proposed ("Extraction of Specular Reflection Using Multiple Color and Range Images", Otsuki, et al., The Institute of Electronics, Information and Communication Engineers Transaction, D-II Vol. J-80-D-II No. 6 pp. 1352–1359, June 1997).

However, in this method, a statistical processing for estimating a color vector is necessary and surfaces of a subject of a certain size with the identical texture are required. Thus, if different materials and colors are combined finely in a subject, it is difficult to use the above-mentioned method for this subject.

On the other hand, in JP 08-039841 A, there is proposed a method in which subject images with different directions of illumination are photographed to obtain a signal of a state in which reflected light is large and a signal of a state in which reflected light is small, and a glossiness signal representing glossiness of the subject is obtained from these two signals and used to provide glossiness by image forming means. However, since the image forming means used in this method does not give a dynamic change to an image of the subject, the feel of glossiness cannot be reproduced on the image. In addition, since the glossiness signal is obtained by subtracting the signal of a state in which reflected light is small from the signal of a state in which reflected light is large, it is also impossible to represent the texture of a woven fiber or the like having directionality in glossiness according to subtle unevenness of a subject.

Moreover, since glossiness is provided by the above-mentioned image forming means through re-heating by heat transfer, a fine texture of a subject cannot be controlled due to spread of heat by the re-heating. Therefore, there is a problem in that the feel of a woven fiber and wrinkle cannot be represented sufficiently.

SUMMARY OF THE INVENTION

The present invention has been devised in order to solve the above-mentioned problems, and it is a first object of the present invention to provide an image display method that is capable of sufficiently representing glossiness on a subject surface and the texture of a subject such as a finely woven texture.

A second object of the present invention is to provide an image processing method for generating an image signal which realizes the image display method.

A third object of the present invention is to provide an image processing apparatus for generating an image signal which realizes the image display method.

A fourth object of the present invention is to provide a scan capturing apparatus that is capable of obtaining an image signal for generating the above-mentioned image signal.

A fifth object of the present invention is to provide an image signal generation method for representing the texture of a subject.

In order to attain the object described above, the present invention provides an image display method comprising: a frame image forming step of obtaining a plurality of original images of a still subject having different states of specular reflection according to illumination to form a plurality of frame images of the still subject based on the plurality of original images; and an image displaying step of switching to a selected frame image from the plurality of frame images to display the selected frame image.

Preferably, the plurality of original images are a plurality of captured images of the still subject that are obtained by changing at least one of a position and a direction of illumination of a light source to illuminate the still subject.

Preferably, the frame image forming step forms sequenced frame images in predetermined order, and the image displaying step selects the sequenced frame images in the predetermined order of the sequenced frame images, sequentially switches the sequenced frame images at a predetermined time interval and, after switching to the last frame image, further sequentially switches the sequenced frame images in order opposite to the predetermined order of this order, thereby sequentially displaying the sequenced frame images repeatedly back and forth at least once.

Preferably, the captured image of plurality of images includes a diffuse reflection image captured by diffuse reflection light of the still subject, and for an area where an image signal value of the captured image is lower compared with an image signal value to which the diffuse reflection image corresponds among areas of the captured image excluding the diffuse reflection image, the frame image forming step forms a composite image by compositing the image signal value of the area and the image signal value of the diffuse reflection image corresponding to the image signal value to use the composite image as the frame image.

The present invention provides an image processing method for generating image signals of frame images of a still subject having different states of specular reflection according to illumination from a plurality of original images of the still subject, comprising: a glossiness signal generation step of generating glossiness signals representing glossiness of the still subject from image signals of the plurality of original images; a window processing step of moving a window function to a moving position that is selected based on an arrangement of pixels of a glossy image represented by the glossiness signals and extracting signal values of the glossiness signals of pixels located in the window function; and a frame image signal generation step of performing a predetermined calculation using the signal values extracted in the window processing step to generate image signals of a frame image corresponding to the moving position of the window function.

More preferably, the window processing step further multiplies the signal values by values of the window function corresponding to the signal values and the frame image signal generation step performs the predetermined calculation using a multiplication result obtained in the window processing step.

Preferably, the image signals of the plurality of original images are first captured image signals of a captured image of a still subject mounted on a planar base and illuminated which is obtained by capturing reflected light of the still subject whose reflection direction is in a relationship of substantially specular reflection with respect to an incident direction of illumination light of the still subject and a plane of the base and second captured image signals of a captured image of the still subject which is obtained by capturing reflected light of the still subject whose reflection direction is in a relationship of diffuse reflection with respect to the incident direction of the illumination light of the still subject and the plane of the base.

Preferably, the first and second captured image signals are subjected to bright correction processing in advance before the glossiness signal generation step.

Preferably, the moving position of the window function in the window processing step is a plurality of positions spaced a fixed distance apart in one direction on the glossy image and an external circumference area of the glossy image, the window processing step moves the window function sequentially to adjacent moving positions among the moving positions and multiplies values of the window function by signal values of the glossiness signals corresponding to pixels located within the window function each time the window function is moved, and the frame image signal generation step sequences frame images corresponding to the moving positions of the window function in association with order of movement of the window function.

Preferably, the interval of the adjacent moving positions of the window function corresponds to a width that is found by adding a width twice as large as a predetermined width to an image width of the glossy image in the moving direction of the window function and dividing a result of the addition by the number of the frame images.

Preferably, in the window processing step, the window function moves with a position the predetermined width apart to the outside from one end of the glossy image as a movement starting position and a position the predetermined width apart to the outside from the other end of the glossy image as a return position, and further moves sequentially to the moving positions from the return position to the movement starting position.

Preferably, the original images are scan captured images obtained by capturing the entire still subject while moving a capturing position relatively to the still subject.

Preferably, the second captured image signals are image signals obtained by illuminating the still subject simultaneously from different two directions.

Preferably, both illumination lights illuminating the still subject from different two directions contain more diffused light components compared with illumination light used in obtaining the first captured image signals.

Preferably, the glossiness signal generation step subtracts conversion values obtained by subjecting values of the second captured image signals to color conversion from conversion values obtained by subjecting values of the first captured image signals to color conversion to generate the glossiness signals.

Preferably, the predetermined calculation in the frame image signal generation step applies inverse conversion of the color conversion to a result of multiplication obtained in the window processing step to find inverse conversion values, and then, adds signal values of the second captured image signals to the inverse conversion values to generate image signals of the frame images.

Preferably, the second captured image signals comprise third captured image signals and fourth captured image signals obtained by illuminating the still subject separately from at least two different directions.

Preferably, both illumination lights illuminating the still subject from the different two directions contain more diffused light components compared with illumination light used in obtaining the first captured image signals.

Preferably, the glossiness signals include first, second and third glossiness signals, and the glossiness signal generation step determines first to fourth conversion values obtained by subjecting signal values of the first to fourth captured image signals to color conversion, respectively, and determines the first to third glossiness signals from the first to fourth conversion values.

More preferably, the glossiness signal generation step, if a first condition that the first conversion value is equal to or more than an average value of the second conversion value and the third conversion value is satisfied, sets a difference found by subtracting the average value from the first conversion value as a signal value of the second glossiness signal and sets signal value of the first and third glossiness signal to zero, if the first condition is not satisfied and a second conditions that the third conversion value is equal to or more than the fourth conversion value is satisfied, sets a difference found by subtracting the first conversion value from the third conversion value as a signal value of the third glossiness value and sets signal values of the first and second glossiness signals to zero, and if both of the first condition and the second condition are not satisfied, a difference found by subtracting a signal value of the first captured image signals from the fourth conversion value is set as a signal value of the first glossiness signals and sets signal values of the second and third glossiness signals to zero.

Preferably, in the window processing step, the window function is used in association with the first, second and third glossiness signals, respectively, and window functions corresponding to the first and third glossiness signals are arranged a predetermined distance apart forward and backward in the moving direction with a window function corresponding to the second glossiness signal as a reference and move with the window function corresponding to the second glossiness signal.

Preferably, the window processing step multiplies values of the window functions corresponding to the first, second and third glossiness signals by the signal values of the first, second and third glossiness signals of corresponding pixels located in the window functions, and the predetermined calculation in the frame image signal generation step adds results of multiplication obtained in association with the first, second and third glossiness signals, subjects a result of addition to inverse conversion of the color conversion to find an inverse conversion value, and then, adds an average value of the signal value of the third captured image signals and the signal value of the fourth captured image signals to the inverse conversion value to generate image signals of the frame images.

The present invention provides an image processing apparatus for generating image signals of frame images of a still subject having different states of specular reflection according to illumination from a plurality of original images of the still subject, comprising: a glossiness signal generation unit of generating a glossiness signal representing glossiness of the still subject from the image signals of the original image; a window processing unit of moving a window function to a moving position that is selected based on an arrangement of pixels of a glossy image represented by the glossiness signal and extracting a signal value of the glossiness signal of corresponding pixels located in the window function; and a frame image signal generation unit of performing a predetermined calculation using the signal value extracted in the window processing unit to generate an image signal of a frame image corresponding to the moving position of the window function.

More preferably, the window processing step further multiplies the signal values by values of the window function corresponding to the signal values and the frame image signal generation step performs the predetermined calculation using a multiplication result obtained in the window processing step.

Preferably, the image signals of the plurality of original images are a first captured image signal of a captured image of a still subject mounted on a planar base and illuminated which is obtained by capturing reflected light of the still subject whose reflection direction is in a relationship of substantially specular reflection with respect to an incident direction of illumination light of the still subject and a plane of the base and a second captured image signal of a captured image of the still subject which is obtained by capturing reflected light of the still subject whose reflection direction is in a relationship of diffuse reflection with respect to the incident direction of the illumination light of the still subject and the plane of the base.

Preferably, the moving position of the window function in the window processing unit is a plurality of positions spaced a fixed distance apart in one direction on the glossy image and an external circumference area of the glossy image, the window processing unit moves the window function sequentially to adjacent moving positions among the moving positions and multiplies a value of the window function by a signal value of the glossiness signal of a corresponding pixel located within the window function each time the window function is moved, and the frame image signal generation unit sequences frame images corresponding to the moving positions of the window function in association with order of movement of the window function.

The present invention provides a scan capturing apparatus for capturing reflected light of an illuminated still subject at a capturing position while moving the illuminated still subject and the capturing position relatively, comprising: a planar base for mounting the still subject; a first light source that is arranged such that an incident direction of illumination light of the still subject in the capturing position is in a relationship of substantial specular reflection with respect to a capturing direction of the still subject in the capturing position and the plane of the base; and a second light source that is arranged such that an incident direction of illumination light of the still subject in the capturing position is in a relationship of diffuse reflection with respect to the capturing direction of the still subject in the capturing position and the plane of the base, wherein the scan capturing apparatus uses the first light source and the second light source separately to capture the still subject.

Preferably, the capturing direction is a direction perpendicular to the plane of the base, and the second light source consists of two light sources for illuminating the still subject from different two directions that form a substantially identical angle with respect to the capturing direction.

Preferably, the two light sources illuminate the still subject simultaneously.

Preferably, the two light sources illuminate the still subject separately.

The present invention provides an image signal generation method for generating an image signal of a frame image of a still subject having different states of specular reflection according to illumination based on a plurality of original images of the still subject, comprising: a step of generating a glossiness signal representing glossiness of the still subject from image signals of the original images; a step of generating parameter information of a window function that moves based on an arrangement of pixels of an glossy image represented by the glossiness signal such that a glossy area of the still subject in the frame image moves to a selected position and extracts information of the glossiness signal; and a step of including at least the glossiness signal in signal information and including parameter information of the window function in header information to generate the image signal of the frame image.

Preferably, the image signals of the original image are a specular reflection image signal of a captured image of a still subject mounted on a planar base and illuminated which is obtained by capturing reflected light of the still subject whose reflection direction is in a relationship of substantially specular reflection with respect to an incident direction of illumination light of the still subject and a plane of the base and a diffuse reflection image signal of a captured image of the still subject which is obtained by capturing reflected light of the still subject whose reflection direction is in a relationship of diffuse reflection with respect to the incident direction of the illumination light of the still subject and the plane of the base; and the signal information includes the diffuse reflection image signal as well as the glossiness signal.

Other objects and features of the present invention will be apparent from the following descriptions taken in conjunction with the accompanying drawings, in which like reference characters designate the same or similar parts throughout the figures thereof.

BRIEF DESCRIPTION OF THE DRAWINGS

In the accompanying drawings:

FIG. 14 explains data structure of an image signal generated by an image signal generation method of the present invention;

DETAILED DESCRIPTION OF THE PREFERRED EMBODIMENTS

An image display method, an image processing method, an image processing apparatus, a scan capturing apparatus and an image signal generation method of the present invention will be described below in detail based on preferred embodiments shown in the accompanying drawings.

Figure 1:
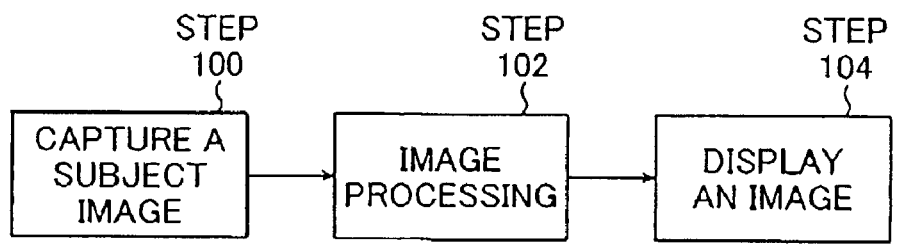
FIG. 1 is a flow chart showing a flow of an example of an image display method of the present invention.

FIG. 1 shows a series of flows for implementing the image display method of the present invention.

First, a still subject such as a substantially planar object or cloth is mounted on a base, and the subject is captured by illuminating the subject from a light source while sequentially changing at least one of a position and a direction of illumination on the subject to obtain a plurality of captured images (step 100). Thereafter, image processing is performed (step 102), a plurality of frame images are formed based on the captured images, and the plurality of frame images are switched to a selected frame image to display an image (step 104).

In addition, in an example to be hereinafter described, frame images are generated by obtaining a plurality of captured images. However, in the present invention, instead of obtaining captured images, a plurality of original images with different states of specular reflection of a still subject depending on illumination may be formed by the CG. That is, the plurality of original images of a still subject in the present invention means a plurality of original images representing the still subject and includes CG images formed by using the CG.

Here, the capturing of a subject includes capturing a subject by camera photographing and capturing a subject using a scanner.

Figure 2:
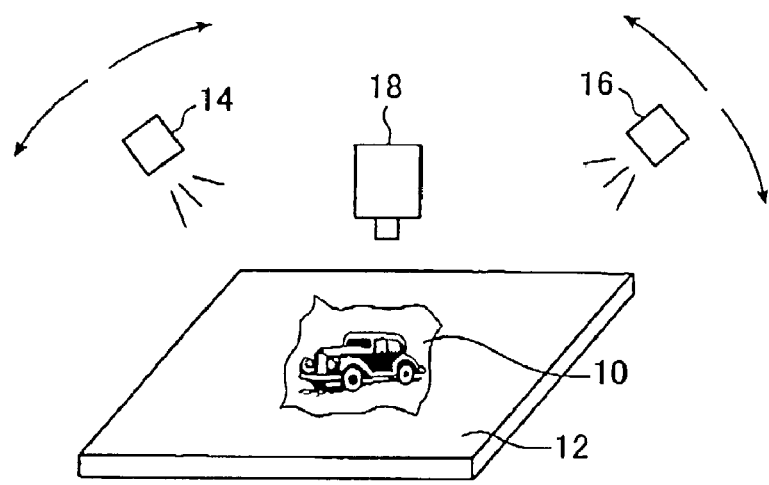
FIG. 2 is a view illustrating an example of capturing of a subject for implementing the image display method of the present invention.
Figure 3:
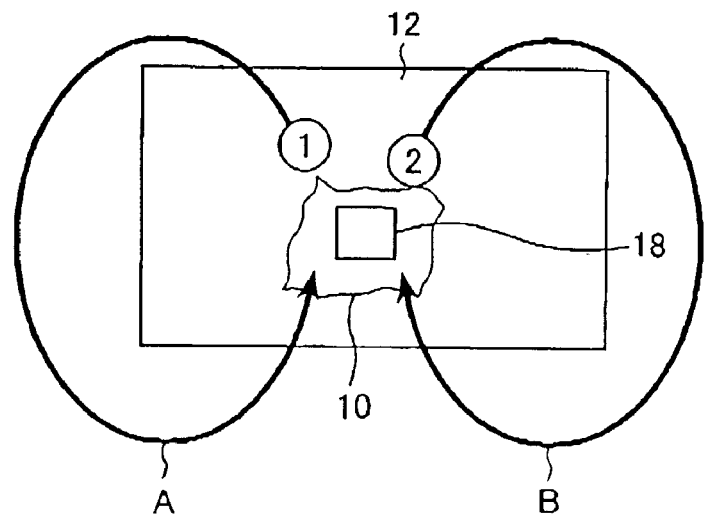
FIG. 3 is a view illustrating another example of capturing of a subject for implementing the image display method of the present invention.

First, as shown in FIG. 2, the capturing using a camera is for placing a still subject 10 on a base 12 and causing strobes 14 and 16 to emit light separately while changing a direction of illumination between two different directions to photograph the subject 10 with a photographing camera 18. Alternatively, as shown in FIG. 3, the subject 10 mounted on the base 12 is illuminated by a light source 1 while moving the light source 1 as shown by an arrow A along a light source moving rail to photograph the subject 10 with the camera 18 at every fixed time during the movement. Thereafter, the subject 10 is illuminated by a light source 2 while moving the light source 2 as shown by an arrow B along a light source moving rail to photograph the subject with the camera 18 at every fixed time during the movement in the same manner and obtain a plurality of captured images.

In addition, a plurality of light sources 1 to 8 are prepared instead of moving a light source, and the camera 18 is installed immediately above the subject 10 mounted on the base 12. The light sources are sequentially caused to emit light in the order of light source 1, light source 5, light source 2, light source 6, light source 3, light source 7, light source 4 and light source 8, and the subject 10 is photographed by the camera 18 and capture each time the light sources are caused to emit light.

Captured images with varying specular reflection light of illumination light illuminating the subject 10 are obtained by such capturing of the subject 10. Further, in the case of capturing of a subject shown in FIG. 4, since there are only a few captured images, the texture such as glossiness of the subject may not be reproduced sufficiently in a displayed image of the subject, as described later. In this case, it is preferable to form images by interpolating captured images, for example, between the light sources 1 and 5, to increase the number of images in the image processing (step 102).

Figure 5:
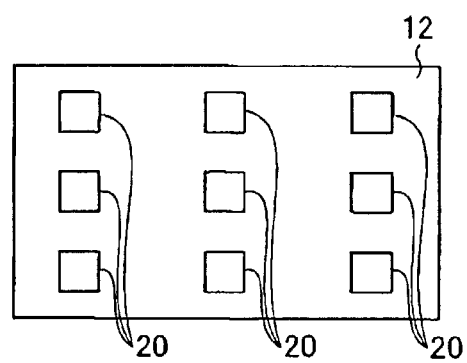
FIG. 5 is a view illustrating correction at the time of capturing of a subject for implementing the image display method of the present invention.

On the other hand, for obtaining captured images by capturing of a subject, since a light source is moved or light sources are switched to change a direction or a position of illumination, an intensity distribution of illumination light on the subject changes every time the subject is illuminated. Thus, as shown in FIG. 5, a reference white plate (reference gray plate) 20 with a high diffusivity is mounted on the base 12 to acquire and store data of an intensity distribution of illumination light as shading correction data in advance prior to the capturing of the subject 10. Thereafter, the subject 10 is mounted on the base 12 and photographed to obtain captured images, which are then subjected to shading correction (brightness correction) using the stored shading correction data. This shading correction is performed as image processing discussed below. Further, since the feel of depth of an image may be lost at the time of image display if the shading correction is performed with the intensity of 100%, an intensity of correction is adjusted appropriately.

Figure 4:
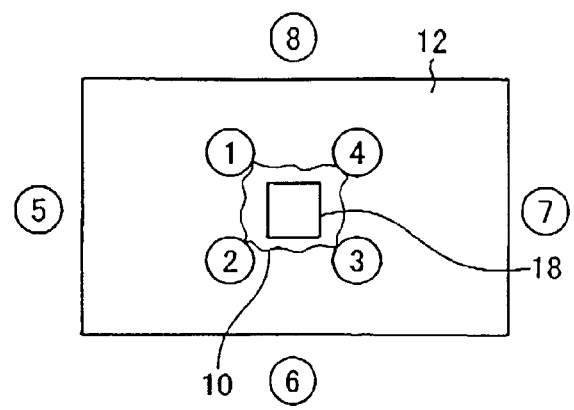
FIG. 4 is a view illustrating another example of capturing of a subject for implementing the image display method of the present invention.

Such capturing of a subject by a camera is for changing an area where specular reflection light of the subject is generated, by moving a light source or switching light sources to thereby obtain captured images. If specular reflection light of the subject is captured, an image with strong contrast is obtained, and noise components are conspicuous due to flat shadows in dark part areas and an insufficient light amount. Thus, in addition to the above-mentioned light sources for illuminating the subject in order to obtain specular reflection light, diffused light that always illuminates a subject without causing specular reflection may be simultaneously used. For example, in the case of switching of light sources as shown in FIG. 4, another light source which slightly emits light to be used as diffused light may be used in addition to the light sources for obtaining specular reflection light.

In addition, in capturing a subject, specular reflection light is used to capture the subject, while diffused light is used to capture the subject as a diffuse reflection image. However, for an area where an image signal value of a captured image is small compared with an image signal value of a corresponding diffuse reflection image among dark part areas of an image that is captured by using specular reflection light, image processing for compositing the signal value of the captured image and the signal value of the diffuse reflection image to form a composite image may be performed. Consequently, brightness of the dark part areas can be increased to be the same level as the diffuse reflection image, and the tendency of contrast of a captured image to be strong can be controlled. A ratio of this composition is adjusted appropriately.

Next, sequenced frame images are formed based on captured images obtained by photographing with the camera. For example, in the case of the movement of the light sources shown in FIG. 3, frame images are sequenced in the order of the movement of the light sources to turn captured images into frame images. The sequenced frame images are sequentially switched in the order of the frame images at predetermined time intervals. After switching to the last frame image, the frame images are further sequentially switched in the opposite order of this order, whereby the sequenced frame images are sequentially displayed on a display repeatedly back and forth at least once. The time required for displaying the frame images back and forth once is preferably in a range of 0.5 to 10 seconds. If the number of frame images is small compared with the time for displaying the frame images back and forth once, since the texture of a subject to be displayed as an image tends not to be represented well, captured images may be interpolated to form frame images.

Although the frame images are displayed by turns in the above-mentioned example, selected frame images may be displayed on the display by changing one to another. For example, a frame image to be selected is determined depending on the movement of a viewpoint of a monitor viewer looking at the display, and a position of a window function in window processing is selected such that a reflection area of a subject displayed as an image fluctuates when seen from the monitor viewer. A frame image subjected to the window processing in this selected position is selected and shown on the display. A viewpoint of the monitor viewer on the display may be determined by, for example, providing the display with a camera for monitoring the monitor viewer, photographing the face of the monitor viewer incessantly and finding an eye area of the monitor viewer and a position of pupils in this eye area from a photographed image of the face using a method such as pattern matching.

The capturing, processing and display of a subject image obtained by photographing with a camera are performed as described above.

Next, capturing of a subject by a scanner will be described.

Figure 6:
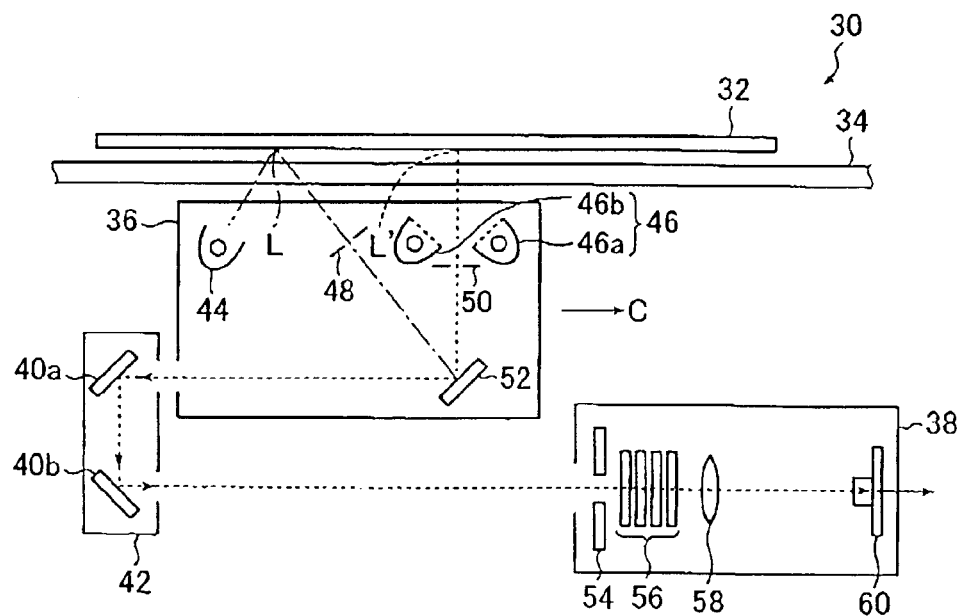
FIG. 6 is a view illustrating main parts of a scanner that is an example of a scan capturing apparatus of the present invention.

FIG. 6 shows a cross section of a main part of a scanner 30 that is an example of the scan capturing apparatus of the present invention.

The scanner 30 has a planar glass base 34 on which a still subject 32 is mounted; an illumination unit 36 for illuminating the subject 32 in such a manner as to scan it in an arrow C direction; a capturing unit 38 for capturing reflected light from the subject 32 as obtained by the illumination unit 36; and a group of mirrors 42 consisting of mirrors 40*a* and 40*b* for guiding the reflected light from the illumination unit 36 to the capturing unit 38. A capturing surface of the subject 32 is directed to the surface side of the glass base 34.

The illumination unit 36 has a light source (first light source) 44 extending in a vertical direction of a paper surface, which is arranged such that an incident direction of illumination light on the subject 32 in a capturing position L of the scanner 30 and a capturing direction in this capturing position L, are in a relationship of substantially specular reflection with respect to a plane of the glass base 34; a light source (second light source) 46 extending in a vertical direction of a paper surface, which is arranged such that an incident direction of illumination light on the subject 32 in the capturing position L of the scanner 30 and a capturing direction in a capturing position L' are in a relationship of diffuse reflection with respect to the plane of the glass base 34; slits 48 and 50 for regulating a position of reflected light from a subject; and a mirror 52 for guiding the reflected light whose position has been regulated by the slits 48 and 50 to the mirror 40*a*. Here, the relationship of substantially specular reflection refers to a relationship in which an incident angle of illumination light with respect to the plane of the base 34 is substantially equal to a reflection angle of reflected light from the subject in the scanner capturing position with respect to the plane of the base 34 (angle in the capturing position formed between the reflected light in the capturing direction and the plane). The relationship of diffuse reflection refers to a relationship in which the incident angle of illumination light is not equal to the reflection angle of reflected light from the subject in the scanner capturing position with respect to the plane of the base 34 (angle in the capturing position formed between the reflected light in the capturing direction and the plane).

Figure 7:
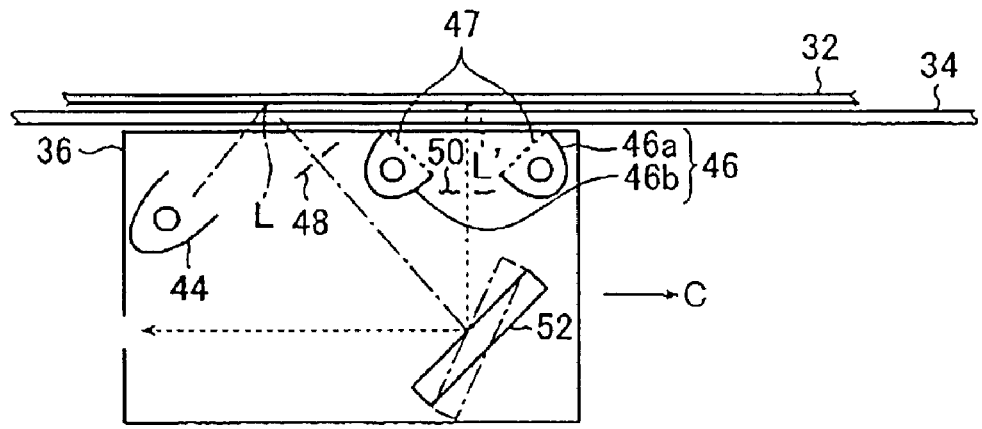
FIG. 7 is a view illustrating an example of capturing of a subject performed by the scanner shown in FIG. 6.

As shown in FIG. 7, the light source 46 consists of a light source 46*a* extending in the vertical direction of a paper surface and a light source 46*b* extending in the vertical direction of a paper surface, and is arranged so as to illuminate the subject 32 from two directions slanted in different directions with respect to the vertical direction of the plane of the glass base 34 at substantially an identical slant angle. In addition, both the light sources 46*a* and 46*b* are provided with diffusion plates 47 for diffusing illumination light. Illumination light of the light sources 46*a* and 46b contain more diffused light components compared with illumination light of the light source 44 that does not have the diffusion plate 47.

A position and a direction of a surface of the mirror 52 are arranged such that reflected light emitted from the light sources 46a and 46b, diffused and reflected by the subject 32 is captured in the vertical direction with respect to the plane of the glass base 34. Moreover, the direction of the surface of the mirror 52 can be adjusted freely such that reflected light from the subject 32 in the capturing position L is guided toward the mirror 40a.

The group of mirrors 42 is a part for guiding reflected light from the illumination unit 36 to the capturing unit 38 and is movable in the arrow C direction so as to allow position adjustment.

On the other hand, the capturing unit 38 has a stop 54 for stopping down an amount of reflected light, a group of filters 56 including color filters and an ND filter, a focusing lens 58 and a line CCD sensor 60.

The scanner 30 having such a structure is an apparatus for capturing reflected light from the illuminated subject 32 in the capturing positions L and L' while relatively moving the subject 32 and the capturing positions L and L' of the scanner 30. With the scanner 30, the light sources 44 and 46 are used separately to capture the subject 32, and an image by specular reflection light (hereinafter referred to as specular reflection image) is captured if the light source 44 is used to illuminate the subject 32, and an image by diffuse reflection light (hereinafter referred to as diffuse reflection image) is captured if the light source 46 is used to illuminate the subject 32.

Further, a position of the group of mirrors 42 with respect to the illumination unit 36 is adjusted such that an optical path of reflected light captured by the capturing unit 38 when the light source 44 is used to illuminate the subject 32 and an optical path of reflected light captured by the capturing unit 38 when the light source 46 is used to illuminate the subject 32 are substantially equal.

In addition, since the capturing position L for capturing the subject 32 using the light source 44 is different from the capturing position L' for capturing the subject 32 using the light source 46, it is necessary to perform positioning of the subject in the specular reflection image and the diffuse reflection image. This positioning is performed by image processing described below. For example, a distance between the capturing position L and the capturing position L' in the moving direction is determined in advance based on a set angle of the surface of the mirror 52, and pixel position correction of an image of the subject 32 is performed based on this distance. Alternatively, an uninterested area of the subject 32 may be marked so that pixel position correction of the subject in the specular reflection image and the diffuse reflection image can be performed with this mark as a reference.

In addition, as in the above-mentioned case of the capturing by the camera photographing, the reference white plate (reference gray plate) 20 with a high diffusivity is mounted on the glass base 34, data of an intensity distribution of reflected light is obtained and stored as shading correction data, and this shading correction data is used to apply shading correction (bright correction) to the specular reflection image and the diffuse reflection image as image processing. In capturing the reference white plate 20, since an intensity of specular reflection light made incident on the capturing unit 38 may be so strong as to exceed a light receiving tolerance of the line CCD sensor 60, the ND filter of the group of filters 56 may be used to perform intensity adjustment of the reflected light so that capturing of the reference white plate 20 and correction by the image processing described below can be performed.

The subject 32 that is substantially planar and has less unevenness of the surface is preferably used for capturing by the scanner 30. However, in the case of a subject having fine unevenness on its surface such as a woven fiber, an area on the subject where specular reflection is generated varies depending on a subtle slant of the surface of the subject.

Thus, as described below, fine unevenness of the subject is taken into account to separately illuminate the light sources 46a and 46b on the subject 32 and obtain different captured images.

Figure 8A:
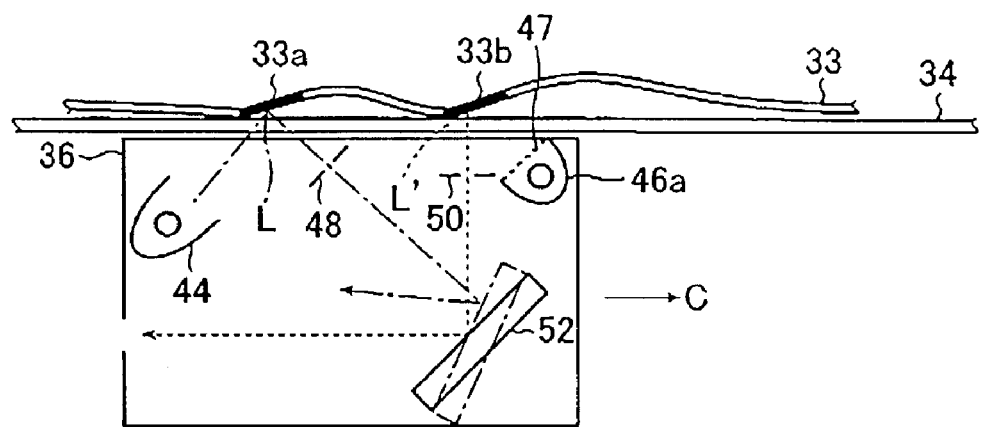
FIGS. 8A and 8B are views illustrating other examples of capturing of a subject performed by the scanner shown in FIG. 6.
Figure 8B:
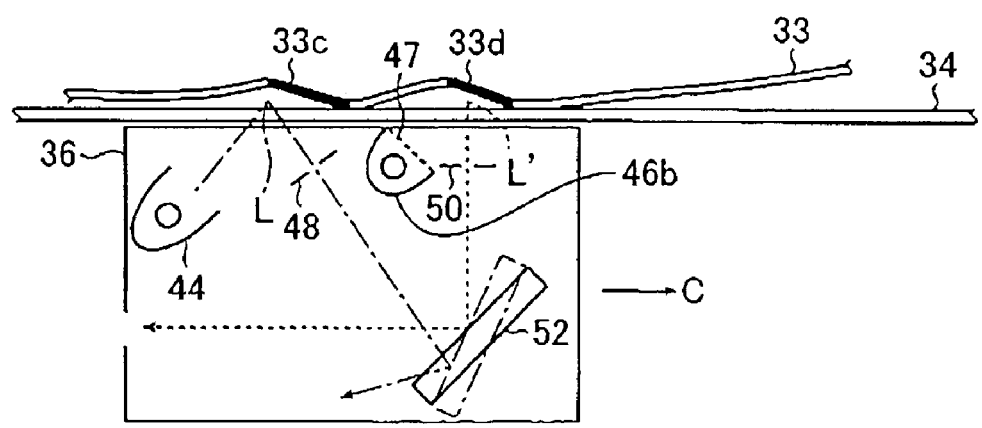

FIGS. 8A and 8B each show a relationship between a surface of a subject 33 having fine unevenness and reflected light. (Each of FIGS. 8A and 8B shows only one of light sources that illuminate a subject.)

If the surface of the subject 33 has no fine unevenness, specular reflection light is reflected in the capturing position L by the mirror 52 and the reflected light reaches via the group of mirrors 42 the capturing unit 38 where it is captured. However, as shown in FIG. 8A, if the subject 33 has unevenness with local slopes (upward slants to the right in FIG. 8A) 33a and 33b, since the surface of the subject in the capturing position L is slant, most of specular reflection light does not reach the capturing unit 38 in the state shown in FIG. 8A. The specular reflection light reflected on the local slope 33a shown in FIG. 8A is captured in the state of a high intensity in the capturing unit 38 only after the illumination unit 36 moves in the arrow C direction for a while from the state shown in FIG. 8A. Therefore, an intensity of the reflected light from the local slope 33a captured by the capturing unit 38 decreases in the state shown in FIG. 8A. On the other hand, if the surface of the subject 33 has no unevenness, diffuse reflection light from the light source 46a is captured in the capturing position L' by the capturing unit 38. However, since the surface of the subject in the capturing position L' is slant, an intensity of reflected light from the local slope 33b captured by the capturing unit 38 increases in the capturing position L' despite the fact that the light source 46a is provided with the diffusion plate 47 and the illumination light from the light source 46a has a lot of diffused light components.

As shown in FIG. 8B, in the case of local slopes (upward slants to the left in FIG. 8B) 33c and 33d whose slant direction is different from that of the local slopes 33a and 33b, an intensity of reflected light from the local slope 33c captured by the capturing unit 38 decreases in the capturing position L. In this case, specular reflection light with a high intensity is captured by the capturing unit 38 in a state prior to the state shown in FIG. 8B. On the other hand, an intensity of reflected light from the local slope 33d captured by the capturing unit 38 increases in the capturing position L'.

In this way, as is seen from FIGS. 8A and 8B, intensities of specular reflection light and diffuse reflection light that are captured in the capturing positions change depending on a slant of a subject. In order to cope with such a change, in image processing described below, a diffuse reflection image obtained by lighting the light source 46a and the light source 46b separately and a specular reflection image obtained by using the light source 44 are used to generate a glossiness signal with directionality, and this glossiness signal and three window functions spaced a fixed distance apart are used to give directionality to reflected light and form frame images representing glossiness of the subject. Note that the glossiness signal is a signal representing glossiness of a subject.

Figure 9:
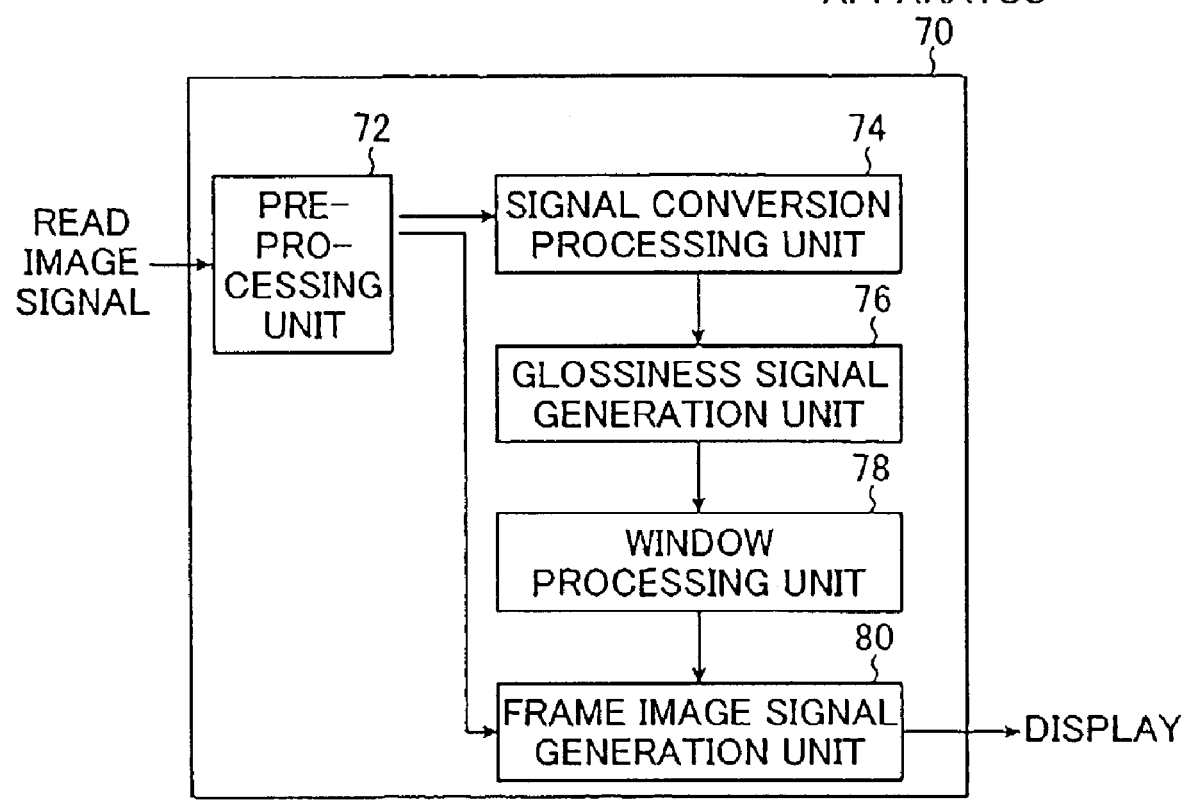
FIG. 9 is a block diagram showing a structure of an example of an image processing apparatus of the present invention.

Such capturing of a subject is performed by the scanner 30, and one specular reflection image and one or two diffuse reflection images are obtained and sent to an image processing apparatus 70 shown in FIG. 9.

Further, with the scanner 30, since the light sources 44 and 46 extend in the vertical direction of the paper surface, only information in one direction (horizontal direction of the paper surface in FIG. 6) is obtained as information of specular reflection light. Therefore, if information of specular reflection of a subject is obtained in a two-dimensional form, it is preferable to rotate a subject to be mounted on the glass base 34 by 90 degrees and captured a specular reflection image by the above-mentioned method.

Since processing in the case in which specular reflection images in two directions are captured is performed in the same method as processing described below, the case in which a specular reflection image in one direction is captured will be hereinafter described.

The image processing apparatus 70 shown in FIG. 9 is an example of the image processing apparatus in accordance with the present invention. It is an apparatus for forming a frame image by using captured image signals of a specular reflection image and a diffuse reflection image that are supplied from the scanner 30.

Figure 10:
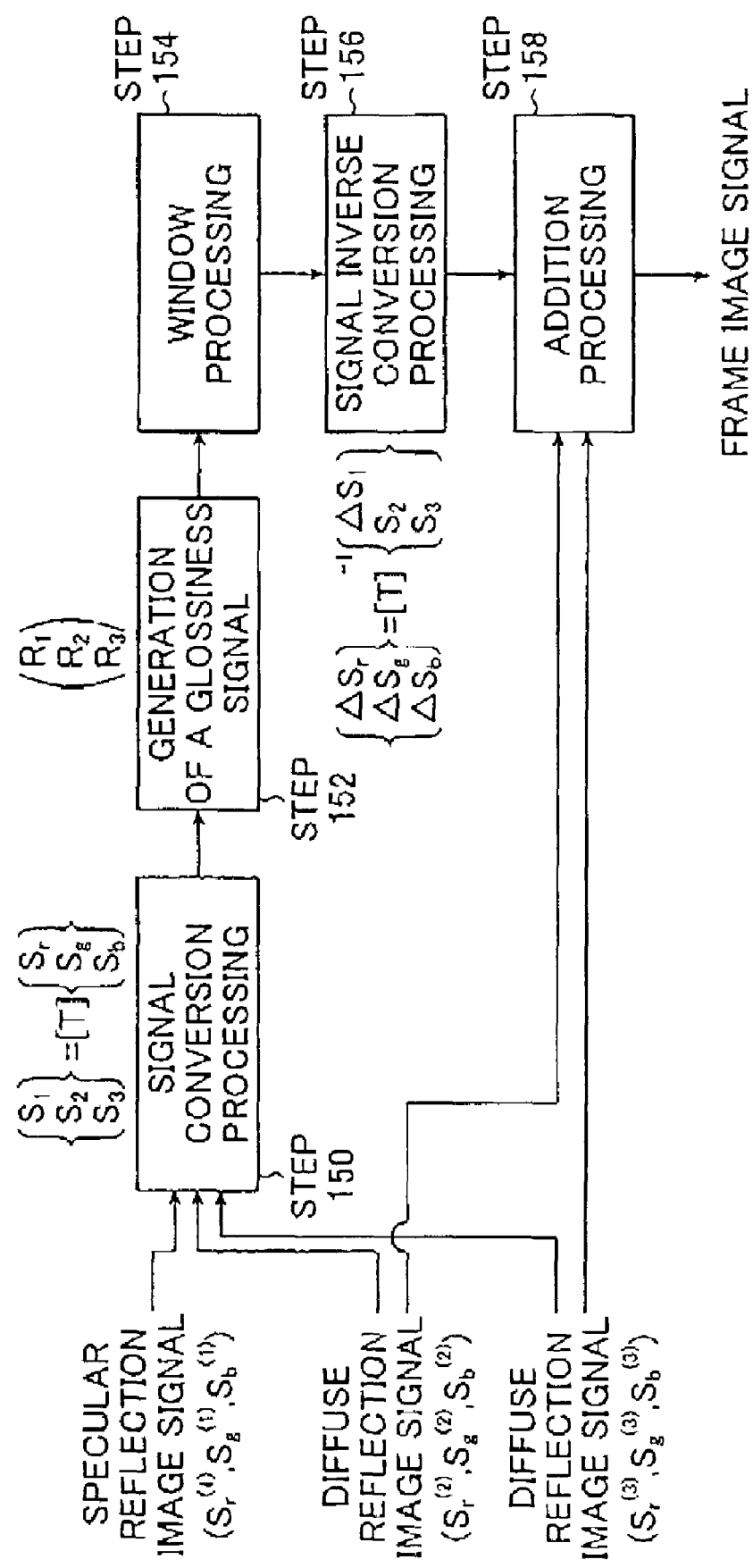
FIG. 10 is a flow chart showing a flow of an example of an image processing method of the present invention.

FIG. 10 shows processing steps carried out by the image processing apparatus 70. The processing steps include signal conversion processing (step 150), generation of a glossiness signal (step 152), window processing (step 154), signal inverse conversion processing (step 156) and addition processing (step 158).

The image processing apparatus 70 is an apparatus having a pre-processing unit 72, a signal conversion processing unit 74, a glossiness signal generation unit 76, a window processing unit 78 and a frame image signal generation unit 80. The image processing apparatus 70 may be a dedicated apparatus in which each part is constituted by a circuit or may be constituted by a computer for starting up software to cause each part to perform the best of its function.

The pre-processing unit 72 subjects a captured image signal to known processing such as pixel position correction, shading correction and positioning of the above subject, and defect correction, dark current correction and γ correction based on the line CCD sensor 60.

The processed captured image signal is sent to the signal conversion processing unit 74 and the frame image signal generation unit 80.

If the captured image signal consists of an R signal, a G signal and a B signal, the signal conversion processing unit 74 converts a signal value $S_r$ of the R signal, a signal value $S_g$ of the G signal and a signal value $S_b$ of the B signal into signal conversion values $S_1$, $S_2$ and $S_3$ by a conversion matrix T, for example, to color signal values of an Y component, an I component and a Q component. That is, the signal conversion unit 74 performs the processing of step 150 shown in FIG. 10.

Here, if signal values $S_r^{(1)}$, $S_g^{(1)}$ and $S_b^{(1)}$ of a specular reflection image signal, two kinds of signal values of diffuse reflection image signals $S_r^{(2)}$, $S_g^{(2)}$ and $S_b^{(2)}$ (image signals of a diffuse reflection image that is captured by using the light source 46a shown in FIG. 8A) and $S_r^{(3)}$, $S_g^{(3)}$ and $S_b^{(3)}$ (image signals of a diffuse reflection image that is captured by using the light source 46b shown in FIG. 8B) are supplied, the signal conversion processing unit 74 applies conversion to each of the supplied image signals.

The conversion matrix T is a matrix that is decided depending on with which color signal components a glossiness signal described below is generated. For example, if a glossiness signal is generated with a luminance component (Y component), the conversion matrix T becomes a known conversion matrix of Y, I and Q components and R, G and B signals. Further, in a glossiness signal, it is preferable to decide color signal components to be set depending on, for example, a spectral intensity characteristic of illumination light from the light source 44 and the light source 46 in the scanner 30 and a color tint of a subject. The signal conversion values $S_1$, $S_2$ and $S_3$ for each pixel of the captured image are sent to the glossiness signal generation unit 76.

The glossiness signal generation unit 76 is a part for extracting a signal conversion value of a color signal component of interest, for example, an Y component (luminance component) in the case of Y, I and Q components, from the signal conversion values $S_1$, $S_2$ and $S_3$, and applying the following processing to the signal conversion value to generate a glossiness signal representing glossiness of the subject (step 152 in FIG. 10). Note that the signal conversion value of the color signal component of interest is set as a signal conversion value $S_1$.

Figure 11:
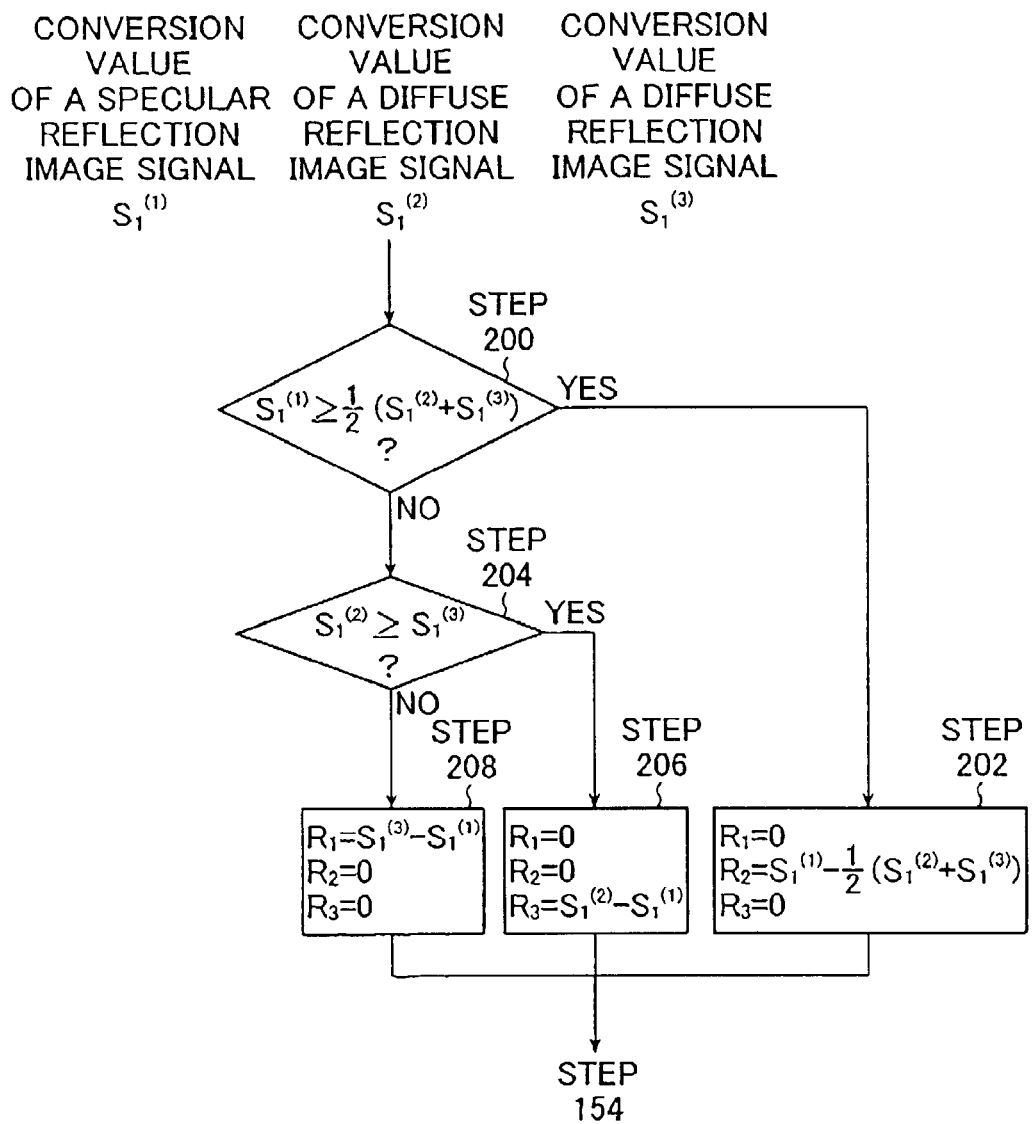
FIG. 11 is a flow chart showing a flow of main parts of the flow shown in FIG. 10.

Assuming that a signal conversion value of a color signal component of interest in a specular reflection image is $S_1^{(1)}$, signal conversion values of color signal components of interest in two diffuse reflection images are $S_1^{(2)}$ and $S_1^{(3)}$ these signal conversion values are processed in accordance with a flow shown in FIG. 11.

The signal conversion values $S_1^{(1)}$, $S_1^{(2)}$ and $S_1^{(3)}$ are compared for each identical pixel position on the captured image (step 200). If the signal conversion value $S_1^{(1)}$ is equal to or more than an average value of the signal conversion values $S_1^{(2)}$ and $S_1^{(3)}$, signal values of a first glossiness signal $R_1$ and a third glossiness signal $R_3$ are set at zero, and a signal value of a second glossiness signal $R_2$ is set at a difference obtained by subtracting the average value of the signal conversion values $S_1^{(2)}$ and $S_1^{(3)}$ from the signal conversion value $S_1^{(1)}$ (step 202).

Further, if a specular reflection image is obtained by capturing specular reflection light with a high intensity and a diffuse reflection image is obtained by capturing diffuse reflection light with a low intensity, the condition that the signal conversion value $S_1^{(1)}$ is equal to or more than the average value of the signal conversion values $S_1^{(2)}$ and $S_1^{(3)}$ is satisfied in step 200.

Next, if the condition in step 200 is not satisfied, the signal conversion values $S_1^{(2)}$ and $S_1^{(3)}$ are compared (step 204). That is, if the signal conversion value $S_1^{(2)}$ is equal to or more than the signal conversion value $S_1^{(3)}$, the signal values of the first glossiness signal $R_1$ and the second glossiness signal $R_2$ are set at zero, and the signal value of the third glossiness signal $R_3$ is set at a difference obtained by subtracting the signal conversion value $S_1^{(1)}$ from the signal conversion value $S_1^{(2)}$ (step 206).

Further, if strong diffuse reflection light is captured when the light source 46a is used to illuminate the subject 33 as shown in FIG. 8A, that is, if the local slope 33b of the subject 33 is captured, the condition in step 204 that the signal conversion value $S_1^{(2)}$ is equal to or more than the signal conversion value $S_1^{(3)}$ is satisfied.

If the condition in step 204 is not satisfied, that is, if the signal conversion value $S_1^{(2)}$ is smaller than the signal conversion value $S_1^{(3)}$, the signal values of the second glossiness signal $R_2$ and the third glossiness signal $R_3$ are set at zero, and the signal value of the first glossiness signal $R_1$ is set at a difference obtained by subtracting the signal conversion value $S_1^{(1)}$ from the signal conversion value $S_1^{(3)}$ (step 208).

Further, the state in which the signal conversion value $S_1^{(2)}$ is smaller than the signal conversion value $S_1^{(3)}$ occurs if strong diffuse reflection light is captured when the light source 46b is used to illuminate the subject 33 as shown in FIG. 8(*b*), that is, if the local slope 33*d* of the subject 33 is captured.

In this way, the glossiness signals (the first glossiness signal $R_1$ to the third glossiness signal $R_3$) are generated for the color signal component of interest.

On the other hand, if one diffuse reflection image is captured by lighting the light sources 46a and 46b simultaneously as shown in FIG. 7, in the signal conversion processing unit 74, signal values $S_r^{(1)}$, $S_g^{(1)}$ and $S_b^{(1)}$ of a specular reflection image signal and signal values of one diffuse reflection image signal (these signal values of the diffuse reflection image signal are assumed to be $S_r^{(4)}$, $S_g^{(4)}$ and $S_b^{(4)}$) are converted to obtain signal conversion values (these signal conversion values are assumed to be $S_1^{(1)}$ and $S_1^{(4)}$) of a color signal component of interest. In the glossiness signal generation unit 76, a difference obtained by subtracting the signal conversion value $S_1^{(4)}$ of a diffuse reflection image of interest from the signal conversion value $S_1^{(1)}$ of a specular reflection image of interest is determined, and this difference is set as a signal value of a glossiness signal.

In this case, as shown in FIG. 7, since the subject 32 is substantially planar, the signal conversion value $S_1^{(1)}$ is larger than the signal conversion value $S_1^{(4)}$.

The generated glossiness signal is sent to the window processing unit 78.

Figure 12:
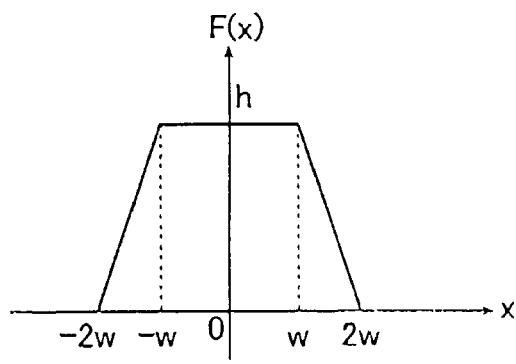
FIG. 12 is a graph illustrating a window function used in the image processing method of the present invention.

The window processing unit 78 is a part for moving a central position of a window function F shown in FIG. 12 to a selected position, and multiplying a signal value of a glossiness signal of a pixel located in the window function F by a value of the window function F every time the central position of the window function F is moved, that is, for performing window processing (step 154 in FIG. 10). When it is assumed that a direction in which information of specular reflection is obtained in the scanner 30, that is, a scan capturing direction is an x direction, the window function F has a distribution of a trapezoid shape with a width of the base of 4*w*, a width of the upper side of 2*w* and a height of h in this x direction.

Figure 13A:
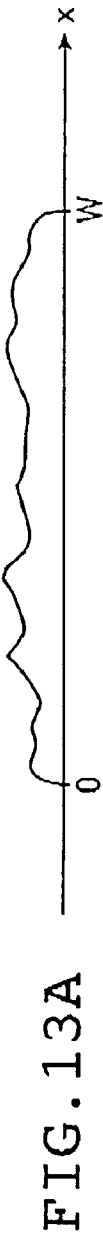
FIGS. 13A to 13E are graphs illustrating movement of the window function used in the image processing method of the present invention.
Figure 13B:
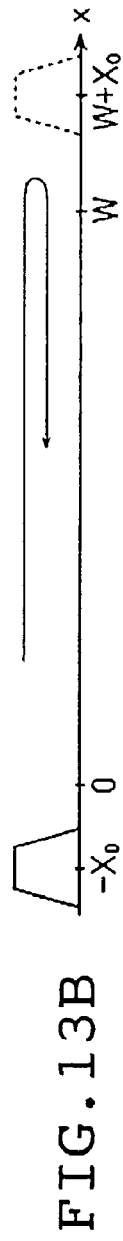

Such a window function F has window functions $F_1$, $F_2$ and $F_3$ in association with the first glossiness signal $R_1$, the second glossiness signal $R_2$ and the third glossiness signal $R_3$. If it is assumed that the number of pixels of a horizontal width (image width) of a captured image such as a diffuse reflection image or a specular reflection image is W as shown in FIG. 13A, a central position of the window function $F_2$ moves in a range of $-X_0$ to $W+X_0$ and moves back and forth in a range of $-X_0$ to $W+X_0$ with an amount of one movement as $(W+2 \cdot X_0)/N$ ($=\alpha$) as shown in FIG. 13B. That is, since the number of pixels of a horizontal width (image width) of a glossy image of a subject represented by the glossiness signals of the first glossiness signal $R_1$, the second glossiness signal $R_2$ and the third glossiness signal $R_3$ is W, the central position of the window function $F_2$ moves back and forth in a range of $-X_0$ to $W+X_0$ with an amount of one movement as $(W+2 \cdot X_0)/N$ ($=\alpha$) based on a pixel arrangement of the glossy image as shown in FIG. 13B. Here, $X_0$ is a parameter representing a movement starting position of a window function F(x) and the number of pixels of a predetermined width defining a return position. That is, the movement starting position is a position $X_0$ apart from one image end of the glossy image to the outside in the moving direction of the window function F(x), and the return position is a position $X_0$ apart from the other image end of the glossy image to the outside in the moving direction of the window function F(x). This parameter is set by an operator, or a parameter set in advance is used.

In addition, N is a number that is a half of the number of frame images in displaying a subject on a display as described below. In this way, the window function $F_2$ moves to a plurality of moving positions, an interval of which is defined by the above-mentioned $\alpha$.

Figure 13C:
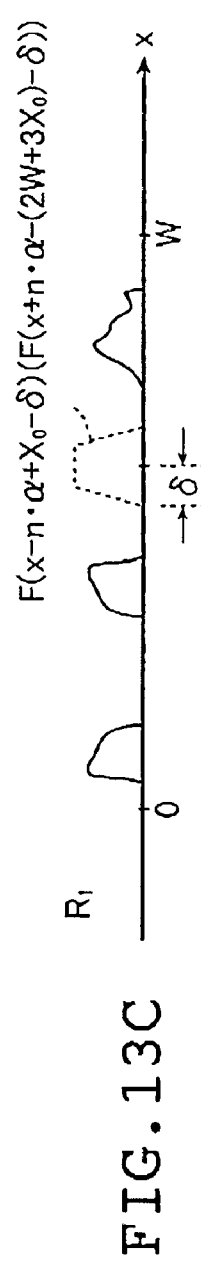
Figure 13D:
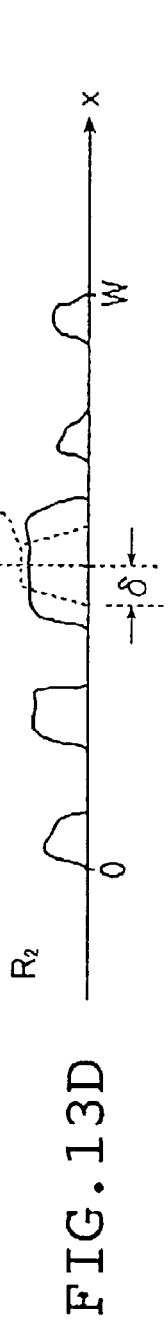
Figure 13E:
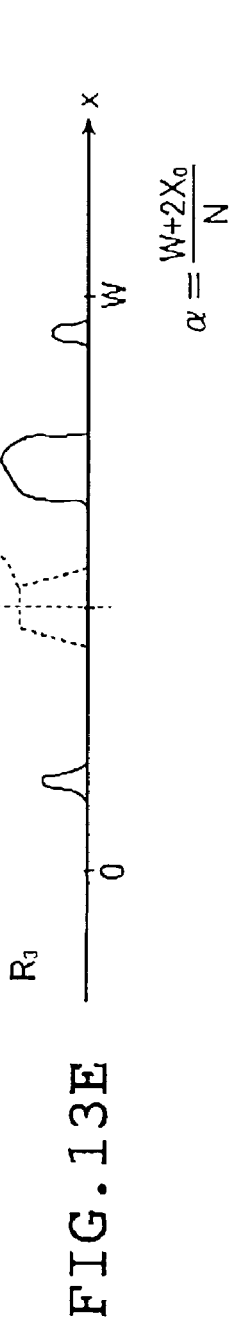

Central positions of the window functions $F_1$ and $F_3$ move simultaneously with the window function $F_2$; the window function $F_1$ moves forward in the moving direction and the window function $F_3$ moves backward in the moving direction while being apart from each other by the number of pixels $\delta$ equivalent to a predetermined distance with the window function $F_2$ corresponding to the second glossiness signal $R_2$ as a reference as shown in FIGS. 13C and 13E. Here, the number of pixels $\delta$ is set by an operator, or is a parameter set in advance. As described concerning the capturing of a subject, this number of pixels $\delta$ is a parameter that is provided in association with a change in an intensity of specular reflection light of a subject according to a slant of fine unevenness of a subject surface. This parameter is used for reproducing the texture such as glossiness of a subject including information on fine unevenness of the subject surface, and set by an operator or set in advance. Consequently, directionality can be given to specular reflection and glossiness of the subject.

Specifically, the window processing is for multiplying a second glossiness signal $R_2$ (x) (x is a coordinate value with a position of one end of a glossy image in an x direction that is a scan capturing direction as x=0) by the window function $F_2 = F(x - n \cdot \alpha + X_0)$ (forward path in the range of $-X_0$ to $W+X_0$), multiplying a first glossiness signal $R_1$ (x) by the window function $F_1 = F(x - n \cdot \alpha + X_0 - \delta)$ located before the window function $F_2$ in the moving direction, and multiplying a third glossiness signal $R_3$ (x) by the window function $F_3 = F(x - n \cdot \alpha + X_0 + \delta)$ located behind the window function $F_2$ in the moving direction.

Further, if the window functions $F_1$, $F_2$ and $F_3$ deviate from an image area of the glossy image, the multiplications are performed with a glossiness signal in the deviating area as zero. That is, in this case, a multiplication result is zero.

Further, the above-mentioned window functions $F_1 = F(x - n \cdot \alpha + X_0 - \delta)$, $F_2 = F(x - n \cdot \alpha + X_0)$ and $F_3 = F(x - n \cdot \alpha + X_0 + \delta)$ are functions in the case of movement on the forward path in the x direction. In the case of movement on the backward path, the window function $F_1$ is $F(x + n \cdot \alpha - (2 \cdot W + 3 \cdot X_0) - \delta)$, the window function $F_2$ is $F(x + n \cdot \alpha - (2 \cdot W + 3 \cdot X_0))$ and the window function $F_3$ is $F(x + n \cdot \alpha - (2W + 3X_0) + \delta)$. Here, n is an order from the movement starting position, which indicates an order of a frame image described below, and is an integer of 0 to $2 \cdot N - 1$. In the case of n=0 to N, movement of the window function corresponds to the forward path, and in the case of n=N+1 and subsequent numbers, corresponds to the backward path.

In this way, multiplication results in accordance with the movement of the window functions $F_1$, $F_2$ and $F_3$, that is, fluctuating according to n are obtained and sent to the frame image signal generation unit 80.

In the frame image signal generation unit 80, the multiplication results calculated in the window processing unit 78 are added to obtain a glossiness fluctuation component $\Delta S_1$. Inverse conversion of the conversion by the above-mentioned conversion matrix T is applied to this glossiness fluctuation component $\Delta S_1$ to obtain inverse conversion values $\Delta S_r$, $\Delta S_g$ and $\Delta S_b$ corresponding to the R signal, the G signal and the B signal (step 156 in FIG. 10). Thereafter, an average value $\frac{1}{2}\cdot(S_r^{(2)}+S_r^{(3)})$ of the R signal, an average value $\frac{1}{2}\cdot(S_g^{(2)}+S_g^{(3)})$ of the G signal, and an average value $\frac{1}{2}\cdot(S_b^{(2)}+S_b^{(3)})$ of the B signal of two kinds of diffuse reflection image signals $S_r^{(2)}$, $S_g^{(2)}$ and $S_b^{(2)}$ and $S_r^{(3)}$, $S_g^{(3)}$ and $S_b^{(3)}$ are added to these inverse conversion values $\Delta S_r$, $\Delta S_g$ and $\Delta S_b$, respectively (step 158 in FIG. 10), and frame image signals of 0 to 2·N−1 sequenced by n are generated.

The obtained frame image signals are sequentially supplied to a display as frame images of subjects of 0 to 2·N−1 (frame images of n=1 to N−1 become frame images in the case of the forward path of the window functions and becomes frame images in the case of the backward path of the window functions) at a fixed time interval in the order of frame images, that is, in the order of n. Then, switching of the sequenced frames images is performed 2·N−1 times or more on the display, that is, at least one back and forth movement of the window functions $F_1$, $F_2$ and $F_3$ is performed, and a reflection area of the subject in the images is shown on the display so as to fluctuate temporally.

In this way, the first glossiness signal $R_1$ to the third glossiness signal $R_3$ according to the direction of the slope by the fine unevenness of the subject are obtained by the method shown in FIG. 11, the first glossiness signal $R_1$ to the third glossiness signal $R_3$ and window functions are used to form the frame images whose reflection area fluctuates temporally, the frame images are sequentially switched and shown on the display, whereby glossiness of the subject having the fine unevenness slanting on its surface can be represented with directionality.

The above-mentioned example explains the case in which the specular reflection image signals $S_r^{(1)}$, $S_g^{(1)}$ and $S_b^{(1)}$, the two kinds of diffuse reflection image signals $S_r^{(2)}$, $S_g^{(2)}$ and $S_b^{(2)}$ and $S_r^{(3)}$, $S_g^{(3)}$ and $S_b^{(3)}$ are supplied as captured image signals. Here, the case will be described in which the light sources 46a and 46b are simultaneously illuminated on the subject 32 in the scanner 30 as shown in FIG. 7, that is, the specular reflection image signals $S_r^{(1)}$, $S_g^{(1)}$ and $S_b^{(1)}$ and one kind of diffuse reflection image signals $S_r^{(4)}$, $S_g^{(4)}$ and $S_b^{(4)}$ are supplied to the image processing apparatus 70 as captured image signals In this case, as in the processing shown in FIG. 10, signal conversion processing (step 150), generation of a glossiness signal (step 152), window processing (step 154), signal inverse conversion processing (step 156) and addition processing (step 158) are performed.

In the signal conversion processing, the specular reflection image signals $S_r^{(1)}$, $S_g^{(1)}$ and $S_b^{(1)}$ are subjected to color conversion by the above-mentioned conversion matrix T, and a signal conversion value $S_1^{(1)}$ of a color signal component of interest is extracted out of three components of signal conversion values. Similarly, the same processing is applied to the diffuse reflection image signals $S_r^{(4)}$, $S_g^{(4)}$ and $S_b^{(4)}$, and a signal conversion value $S_1^{(4)}$ is extracted.

Next, a glossiness signal R is obtained in accordance with the following expression:

$$R=S_1^{(1)}-S_1^{(4)}$$

In the window processing, window functions $F_4=F(x-n\cdot\alpha+X_0)$ (forward path) and F $(x+n\cdot\alpha-(2\cdot W+3\cdot X_0))$ (backward path) are used, which move on a glossy image of the subject represented by a glossiness signal in the same manner as the above-mentioned window function $F_2$. Then, a value of the window function $F_4$ is multiplied by a value of the glossiness signal R of pixels located in this window function $F_0$.

In the signal inverse conversion processing, the above-mentioned multiplication result is assumed to a glossiness fluctuation component $\Delta S_1$, to which inverse conversion of the conversion by the above-mentioned conversion matrix T is applied, and inverse conversion values $\Delta S_r$, $\Delta S_g$ and $\Delta S_b$ corresponding to an R signal, a G signal and a B signal are obtained. Then, components of the diffuse reflection image signals $S_r^{(4)}$, $S_g^{(4)}$ and $S_b^{(4)}$ are added to the inverse conversion values $\Delta S_r$, $\Delta S_g$ and $\Delta S_b$, respectively (step 158 in FIG. 10), and frame image signal values sequenced by n are generated. The generated frame image signals are sequentially supplied to the display at a fixed time interval according to the order of n.

In this way, a glossiness signal is obtained by subtracting a conversion value of a diffuse reflection image signal from a signal conversion value of a specular reflection image signal, the glossiness signal and window functions are used to form frame images whose reflection areas fluctuate temporally, and the frame images are sequentially switched and displayed in order on a display, whereby glossiness of a smooth and substantially planar subject without fine unevenness on its surface can be represented.

Although the window function used in the above-mentioned example is a function having a distribution in one direction and moving in that direction, a window function may be a function having a two-dimensional distribution and freely moving in any direction on an image.

Further, although the glossiness signal in the above-mentioned example is generated by color signal components subjected to color conversion, the present invention is not limited to this and a maximum difference among differences between image signal values of diffuse reflection images and image signal values of specular reflection images in an R signal, a G signal and a B signal may be set as a signal value of the glossiness signal.

Although frame images are displayed on a display in the order of movement of a window function in the above-mentioned example, in the present invention, frame images selected according to movement of a viewpoint of a monitor viewer looking at a display may be displayed on the display while switching one to another.

In this way, glossiness signals for forming frame images representing the texture such as glossiness of a subject may be generated collectively as one standardized image signal with diffuse reflection image signals and stored and held in the image processing apparatus 70 or may be recorded onto various recording media.

A data structure of such a standardized image signal and a method of generating the image signal will be described.

FIG. 14 shows an example of a standardized image signal format.

An image signal is a 32-bit signal. The 32-bit signal has an R signal, a G signal and a B signal, each of which is an 8-bit signal, and first to fourth reflection signals, each of which is 2-bit signal.

Here, a diffuse reflection image signal obtained through illuminating a subject by the light sources 46a and 46b shown in FIG. 7 or, if two kinds of diffuse reflection image signals are supplied as shown in FIG. 10, a signal represented by an average value of these two kinds of diffuse reflection image signals corresponds to the diffuse reflection image signal.

On the other hand, the first to fourth reflection signals are signals representing glossiness of a subject which are generated based on specular reflection image signals by specular reflection light of the subject and diffuse reflection image signals by diffuse reflection light of the subject as described above. An attribute of each signal is decided by header information shown below.

For example, as shown in FIG. 14, the above-mentioned first glossiness signal $R_1$ to third glossiness signal $R_3$ by specular reflection light in the x direction and the glossiness signal (fourth glossiness signal) in one direction different from the x direction, for example, the y direction perpendicular to the x direction, a direction slanting at an angle θ from the x direction, or the like correspond to the first to fourth reflection signals.

The glossiness signals representing the first to fourth reflection signals are generated by, for example, the method of steps 150 to 152 shown in FIG. 10 as described above based on the specular reflection image signals and the diffuse reflection image signals.

Here, as information concerning attributes of the first to fourth reflection signals, there is information on, for example, a specular reflection moving direction, a specular reflection intensity, a specular reflection size, a specular reflection moving period, a specular reflection phase and a specular reflection moving distance. The information is set in accordance with an instruction by an operator or is set as default in advance to be prepared as a part of header information of an image signal.

The information on a specular reflection moving direction is information on the above-mentioned moving direction in a window function such as the x direction, the y direction or the direction slanting at an angle θ from the x direction. The information on a specular reflection intensity is information on a maximum value of a window function, for example, in the case of the window function F shown in FIG. 12, is information on the height h. The information on a specular reflection size is information representing a horizontal width of a window function, for example, in the case of the window function F shown in FIG. 12, is information on the width w. The information on a specular reflection moving period is information for defining a period that is obtained by dividing the number of frame images 2·N to be displayed by a frequency for switching frame images on a display, that is, information on N. The information on a specular reflection phase is information on the number of pixels δ shown in FIGS. 13C to 13E. The information on a specular reflection moving distance relates to a range in which a window function moves and is information such as the value of $X_0$ in the movement in the x direction shown in FIG. 13B, a value of $Y_0$ in the movement in the y direction or a value of $L_0$ in the direction of an angle θ.

As described above, the information concerning the attributes of the first to fourth reflection signals is parameter information of a window function that moves within a pixel arrangement of a glossy image such that a glossy area of a subject in a frame image moves to a predetermined position to extract information on glossiness signals to be the first to fourth reflection signals. Image signal of the frame image is generated with this parameter information included as a part of header information and with the first to fourth reflection signals, which are diffuse reflection image signals and glossiness signals, used as signal information.

Figure 15:
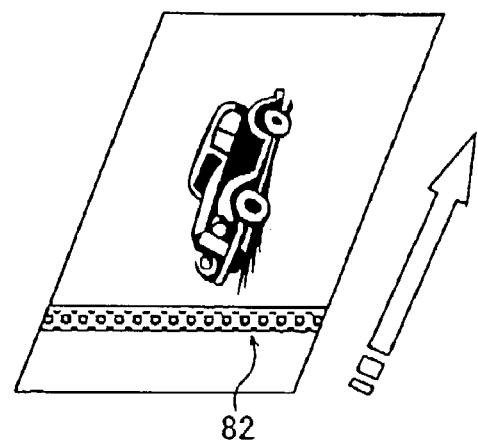
FIG. 15 is a view illustrating the image display method of the present invention.

This image signal of the frame image, that is, the parameter information of the window function as header information and the first to fourth reflection signals, and the diffuse reflection image signals are used to perform the processing of steps 154 to 158 shown in FIG. 10, whereby frame images in which the glossy area of a still subject moves in accordance with the order of the frame images are formed, and these frame images are displayed on a display. Then, as shown in FIG. 15, a belt 82 of imprinting of illumination light by specular reflection light is reproduced on the display so as to move temporally on the subject in an arrow direction in FIG. 15 or in the opposite direction.

Alternatively, a frame image is formed according to movement of a viewpoint of a monitor viewer looking at the display and shown on the display.

An image signal for forming such a standardized frame image can be preferably generated in the case in which the above-mentioned scanner 30 is used to capture a subject. In the case of the above-mentioned camera photographing in which light sources are moved or switched to change a direction or a position of illumination to thereby capture a subject, an image signal is generated by a method described below.

Figure 16A:
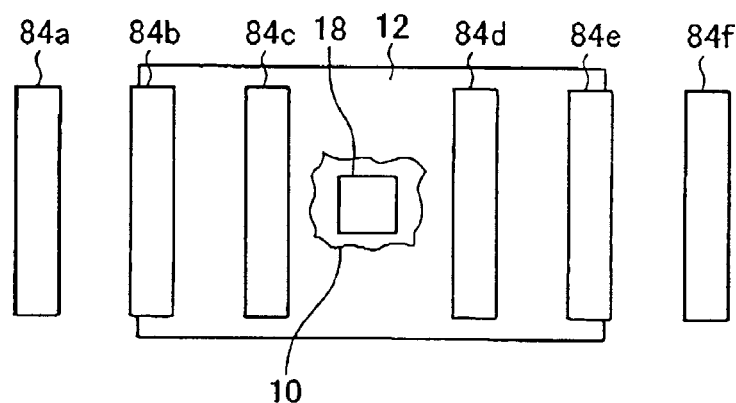
FIGS. 16A and 16B are views illustrating capturing of a subject that is carried out for performing the image signal generation method of the present invention.
Figure 16B:
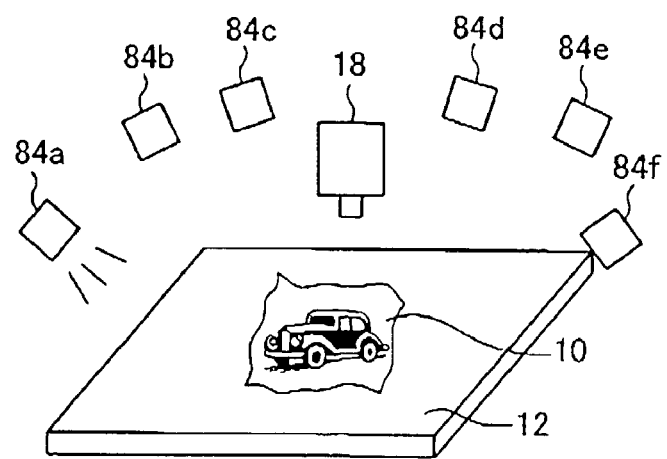
Figure 17:
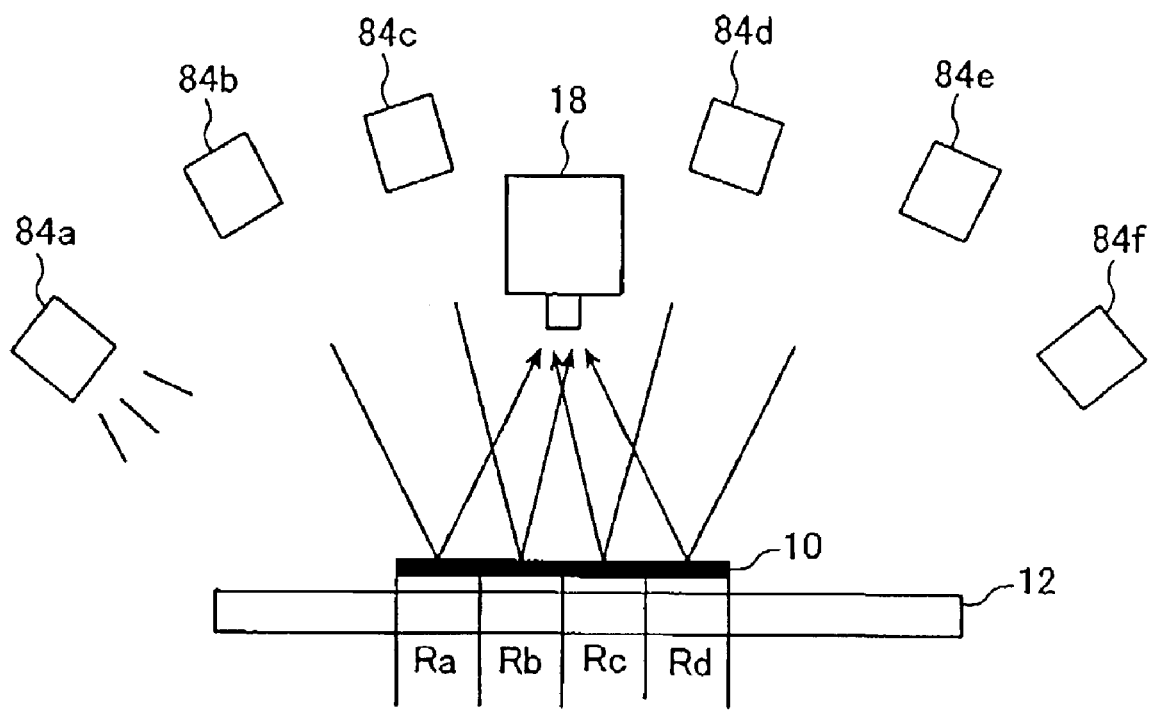
FIG. 17 is a view illustrating capturing of a subject that is carried out for performing the image signal generation method of the present invention.

For example, as shown in FIG. 16A and 16B, in the case in which the subject 10 is mounted on the base 12, linear light sources 84a to 84f extending in one direction are arranged, and the light sources 84a to 84f are switched by turns to photograph the illuminated subject 10 by the camera 18, the area of the subject 10 is divided into multiple areas such as areas Ra to Rd as shown in FIG. 17, and slopes formed by fine unevenness on the subject surface in each area are classified into slant upward to the right, horizontal and slant upward to the left. Then, based on a positional relationship between the light sources 84a to 84f and each area, it is checked in advance, for all combinations of the light sources and the areas, if the first reflection signal (see FIG. 14) corresponding to the above-mentioned first glossiness signal $R_1$ is obtained, if the second reflection signal (see FIG. 14) corresponding to the above-mentioned second glossiness signal $R_2$ is obtained or if the third reflection signal (see FIG. 14) corresponding to the above-mentioned third glossiness signal $R_3$ is obtained Then, associations between the combinations of the light sources and the areas and the first to third reflection signals are set as shown in Table 1 below. Further, in addition to the capturing by illumination of the light sources 84a to 84f, diffuse reflection image signals of the subject that is captured by using illumination light containing more diffuse reflection light components than illumination light from the light sources 84a to 84f are obtained in advance.

TABLE 1

| | Subject surface | Area Ra | Area Rb | Area Rc | Area Rd |
|---|---|---|---|---|---|
| First reflection signal | Slope upward to the right (/) | Light source 84a | Light sources 84a, 84b | Light sources 84a–84c | Light sources 84a–84d |
| Second reflection signal | Substantially horizontal surface (–) | Light source 84b | Light source 84c | Light source 84d | Light source 84e |
| Third reflection signal | Slope upward to the left (\) | Light sources 84c–84f | Light sources 84d–84f | Light sources 84e, 84f | Light source 84f |

Table 1 shows that, in the area Ra for example, specular reflection light by the light source 84a is captured if the subject surface is a slope upward to the right, specular reflection light by the light source 84b is captured if the subject surface is a substantially horizontal surface, and specular reflection light by the light sources 84c to 84f is captured if the subject surface is a slope upward to the left. It is set which of the first to third reflection signals is obtained according to the classification by such combinations of the light sources 84a to 84f and the divided areas Ra to Rd of the subject. The first to third reflection signals are set by a method described below based on which of the first to third reflection signals is obtained.

For example, as is seen from Table 1, the first reflection signal is obtained in the area Rb in the case of illumination by the light sources 84a and 84b. That is, if a maximum value among signal conversion values, which are obtained by converting image signal values in illuminating the subject with each of the light sources 84a and 84b using the same conversion matrix T as in step 150 shown in FIG. 10, is larger than a signal conversion value of a diffuse image signal that is converted by using the conversion matrix T, a difference obtained by subtracting the signal conversion value of the diffuse image signal from this maximum value is set as a signal value of the first reflection signal, and signal values of the second and third reflection signals are set at zero.

Similarly, the third reflection signal is obtained in the case of illumination by the light sources 84d to 84f. That is, a maximum value among signal conversion values of image signal values in illuminating the subject by each of the light sources 84d to 84f is larger than a signal conversion value of a diffuse image signal, a difference obtained by subtracting the signal conversion value of the diffuse image signal from this maximum value is set as a signal value of the third reflection signal, and signal values of the first and second reflection signals are set at zero.

The second reflection signal is obtained in the same manner.

Although, if there are a plurality of signal conversion values, a maximum value is selected out of the signal conversion values and this maximum value is compared with a signal conversion value of a diffuse image signal in the above-mentioned example, an average value of the plurality of signal conversion values may be used instead of this maximum value.

In this way, in the case in which the subject 10 mounted on the base 12 is photographed and captured by the camera 18, as in the case of capturing a subject using the scanner 30, the signal conversion processing of step 150 shown in FIG. 10 is performed based on a specular reflection image signal of a captured image of the subject 10 obtained by capturing reflected light from the illuminated subject 10 mounted on the planar base 12, whose direction of reflection is in a relationship of substantially specular reflection with respect to an incident direction of illumination light on the subject 10 and the plane of the base 12, and a diffuse reflection image signal of a captured image of the subject 10 obtained by capturing reflected light from the subject 10 whose direction of reflection is in a relationship of diffuse reflection with respect to the incident direction of illumination light on the subject 10 and the plane of the base 12. Thereafter, the first to third reflection signals corresponding to the first to third glossiness signals $R_1$ to $R_3$ and the fourth reflection signal are generated, which are used as signal information of standardized image signals together with the diffuse reflection image signals.

Moreover, parameter information of the above-mentioned window function for carrying information on a glossiness signal on a diffuse reflection image signal is generated as a part of header information of a standardized image signal such that a glossy area in an image of a subject moves in accordance with the order of frame images. Consequently, image signals of a sequenced plurality of frame images can be generated in the same method as steps 154 to 158.

Alternatively, a frame image may be selected out of a plurality of frame images calculated by the window processing according to movement of a viewpoint of a monitor viewer looking at a display to change a glossy area of a subject according to the movement of the viewpoint of the monitor viewer such that the selected frame image can be displayed through switching.

In addition, although a frame image is formed from a captured image obtained by a scanner or by photographing with a camera in all of the above-mentioned embodiments, an image whose specular reflection state varies according to illumination may be formed by CG and used as an original image for forming a frame image as described above.

The image display method, the image processing method, the image processing apparatus, the scan capturing apparatus and the image signal generation method of the present invention have been described in detail. However, it is needless to mention that the present invention is not limited to the above-mentioned embodiments and various improvements and modifications may be performed without departing from the scope of the present invention.

As described above in detail, in displaying a subject on a display, since a reflection area for reflecting illumination light as specular reflection light is changed temporally on an image to reproduce a change in imprinting of a light source, the texture such as glossiness can be reproduced on the display. Moreover, since an image signal with directionality given to reflected light according to a reflection surface formed by fine unevenness of the subject is generated, even when the subject is displayed on a display, temporal fluctuation according to the fine unevenness of the subject can be given to generation of the reflection area on the subject to reproduce the more realistic texture. In particular, it becomes possible to reproduce the texture of a three-dimensional object Further, in the image signal generation method of the present invention, a parameter for defining a window function is included in header information, and each reflection signal is included as signal information in addition to a diffuse reflection image signal. Thus, if a frame image whose reflection area by specular reflection fluctuates temporally is formed, a data amount can be reduced compared with the conventional three-dimensional CG and processing calculation can be performed easily. In addition, since the diffuse reflection image signal or each reflection signal is standardized as an image signal, the standardized image signal can be used effectively as communication data on a network.

What is claimed is:

1. An image display method comprising:
   a frame image forming step of obtaining a plurality of original images of a still subject viewed from a viewpoint and having different states of specular reflection which are generated by changing at least one of a position and a direction of illumination of a light source to illuminate the still subject to form a plurality of frame images of said still subject based on the plurality of original images; and
   an image displaying step of switching to a selected frame image from said plurality of frame images to display the selected frame image, wherein the viewpoint is a fixed viewpoint.

2. The image display method according to claim 1,
   wherein said frame image forming step forms sequenced frame images in predetermined order, and
   wherein said image displaying step selects the sequenced frame images in the predetermined order of the sequenced frame images, sequentially switches the sequenced frame images at a predetermined time interval and, after switching to the last frame image, further sequentially switches the sequenced frame images in order opposite to the predetermined order of this order, thereby sequentially displaying the sequenced frame images repeatedly back and forth at least once.

3. The image display method according to claim 1, wherein said plurality of original images are a plurality of captured images of the still subject by an image reading unit, the captured images obtained by changing at least one of a position and a direction of illumination of a light source to illuminate the still subject, and wherein said plurality of frame images to be formed consist of said images.

4. The method of claim 1, wherein the image forming step represents at least one of a texture and glossiness of the still object based on the different states of specular reflection.

5. The method of claim 1, wherein the image forming step comprises a still object capture.

6. An image display method comprising:
   a frame image forming step of obtaining a plurality of original images of a still subject having different states of specular reflection according to a change in illumination to illuminate the still subject to form a plurality of frame images of said still subject as a captured image of a plurality of images based on the plurality of original images; and
   an image displaying step of switching to a selected frame image from said plurality of frame images to display the selected frame image,
   wherein said captured image of plurality of images includes a diffuse reflection image captured by diffuse reflection light of the still subject, and
   wherein, for an area where an image signal value of said captured image is lower compared with an image signal value to which said diffuse reflection image corresponds among areas of said captured image excluding said diffuse reflection image, said frame image forming step forms a composite image by compositing the image signal value of the area and the image signal value of said diffuse reflection image corresponding to the image signal value to use the composite image as said frame image.

7. An image display method comprising:
   a frame image forming step of obtaining a plurality of original images of a still subject having different states of specular reflection according to a change in illumination to illuminate the still subject to form a plurality of frame images of said still subject based on the plurality of original images; and
   an image displaying step of switching to a selected frame image from said plurality of frame images to display the selected frame image,
   wherein said plurality of original images includes a diffuse reflection image captured by diffuse reflection light of the still subject, and
   wherein, for an area where an image signal value of at least one of said plurality of original images is lower compared with an image signal value to which said diffuse reflection image corresponds among areas of said plurality of original images excluding said diffuse reflection image, said frame image forming step forms a composite image by compositing the image signal value of the area and the image signal value of said diffuse reflection image corresponding to the image signal value to use the composite image as said frame image.

* * * * *